United States Patent
Krief et al.

(10) Patent No.: US 7,164,728 B1
(45) Date of Patent: Jan. 16, 2007

(54) METHOD AND DEVICE FOR FORMING TRANSPORT FRAMES FROM CODED-SIGNAL FRAMES AND DEVICE FOR EXTRACTING CODED SIGNAL FRAMES

(75) Inventors: Albert-Patrick Krief, Savigny-sur-Orge (FR); Pierre Force, Nezel (FR)

(73) Assignee: Matra Nortel Communications, Quimper (FR)

(*) Notice: Subject to any disclaimer, the term of this patent is extended or adjusted under 35 U.S.C. 154(b) by 735 days.

(21) Appl. No.: 10/031,424

(22) PCT Filed: Jul. 21, 2000

(86) PCT No.: PCT/FR00/02105

§ 371 (c)(1),
(2), (4) Date: Mar. 28, 2002

(87) PCT Pub. No.: WO01/08335

PCT Pub. Date: Feb. 1, 2001

(30) Foreign Application Priority Data

Jul. 26, 1999 (FR) .................................. 99 09679

(51) Int. Cl.
*H04K 1/02* (2006.01)

(52) U.S. Cl. ...................... 375/296; 375/278; 714/752; 714/758

(58) Field of Classification Search ................ 375/296, 375/278; 714/752, 758
See application file for complete search history.

(56) References Cited

U.S. PATENT DOCUMENTS 5,502,713 A * 3/1996 Lagerqvist et al. ......... 370/252
6,711,182 B1 * 3/2004 Gibbs et al. ................ 370/537

FOREIGN PATENT DOCUMENTS

EP  0 595 781 A2  5/1994
EP  0 730 356 A2  9/1996

* cited by examiner

*Primary Examiner*—Kevin Kim
(74) *Attorney, Agent, or Firm*—Trop, Pruner & Hu, PC

(57) ABSTRACT

Transport frames to be transmitted on a communication channel are formed from coded-signal frames. Each coded-signal frame comprises one or more sets of bits to be protected against transmission errors. A respective error detection code is calculated for a subset of bits, and placed in a respective transport frame along with this subset of bits. Some at least of the transport frames contain a plurality of subsets of bits, emanating from different coded-signal frames and accompanied by the corresponding error detection codes.

11 Claims, 4 Drawing Sheets

METHOD AND DEVICE FOR FORMING TRANSPORT FRAMES FROM CODED-SIGNAL FRAMES AND DEVICE FOR EXTRACTING CODED SIGNAL FRAMES

BACKGROUND OF THE INVENTION

The present invention relates to the field of the shaping of digital signals with a view to their transmission, and especially to a method and a device for forming transport frames from coded-signal frames emanating from a source.

The invention applies in particular, but not exclusively, to the transmission on a radio channel of voice signals from a vocoder.

The channel coding procedures used to form transport frames implement error detection and/or correction techniques using redundant codes applied to the coded-signal frames. Often, the bits of the frames produced by the source are cataloged into several classes to which are applied protection measures which are more or less effective against transmission errors, to achieve a compromise between the need to detect or correct any errors as a function of the importance of the information transmitted and the bandwidth required thereby.

In the example of voice communications in the GSM cellular radiocommunication system, the vocoder produces 260 bits per coded-signal frame of 20 ms, of which 50 bits are in class C1$a$, 132 bits are in class C1$b$ and 78 bits are in class C2. The mechanism for forming the transport frames from the frames of the vocoder is a synchronized mechanism, one transport frame being produced every 20 ms for each voice frame. The bits of classes C1$a$ and C1$b$ are protected by a convolutional code of rate ½ allowing the receiver to correct transmission errors. Before this coding, 3 parity bits are appended to the 50 bits of class C1$a$ to allow the detection of residual errors among these bits, which are the most sensitive. The transport frame formed by the 378 bits produced by the convolutional coder and by the 78 bits of class C2 is transmitted on the radio channel with temporal interleaving with other transport frames. Interleaving is envisaged to best utilize the correction capabilities of the convolutional code given the type of propagation channel of the GSM system.

In the GSM system, it is also envisaged that the physical channel on which the transport frames are transmitted in respect of a given communication can be shared with a fast signaling logical channel associated with this communication. This signaling channel, called the FACCH ("Fast Associated Control Channel"), is formed by a frame stealing mechanism: it gives rise to the loss of a transport frame corresponding to an output frame from the vocoder. This results in a loss of quality at the receiver level, which is only permissible because the stolen frames are in principle rare.

The frame stealing mechanism is not suitable when, on the same physical channel, a non-negligible bandwidth relative to that of the voice communication is needed. This occurs for example when signaling information representing a significant bit rate is multiplexed on the same physical channel as the speech signal. Another case is that of a frequency division multiple access (FDMA) cellular mobile radio-communication station which, when it is communicating with a base station on a traffic channel, has time intervals for regularly monitoring beacon channels formed by neighboring base stations so as, as the case may be, to allow the communication to be handed over to the base station affording the best radio propagation conditions (see for example French Patent Application No. 99 06345).

Typically, for this kind of application, it is desirable to deploy a channel coding scheme making it possible to transmit the N coded-signal frames emanating from a vocoder for a duration T in M transport frames available for this duration T, to free part of the transmission resource for this duration T to make it possible to multiplex other logical channels or to reserve windows for other functions, e.g. monitoring.

An object of the present invention is to propose such a scheme.

SUMMARY OF THE INVENTION

According to the invention, there is proposed a method for forming transport frames, to be transmitted on a communication channel, from coded-signal frames, wherein each coded-signal frame comprises at least one set of bits to be protected against transmission errors, including at least one subset of bits for which a respective error detection code is calculated. Each of said subsets of bits is placed in a transport frame with its respective error detection code, and some at least of the transport frames contain several subsets of bits, emanating from different coded-signal frames and accompanied by their respective error detection codes.

A mixing of the coded-signal frames in the successive transport frames is thus achieved, making it possible to adjust the flows between the source and the logical communication channel. It is especially advantageous that the method retains the assigning to the coded-signal frames of the protection information as represented by the error detection codes. The decoder can therefore accurately identify the subsets of bits containing errors. It thus avoids the spreading of an error arising in a pointwise localized manner in a transport frame over the various coded-signal frames which supplied subsets of bits to this transport frame.

Said set of bits to be protected corresponds to a protection class. The method is applicable when there is a single protection class in the coded-signal frames, and for which class error detection codes are employed. When there are several protection classes, it is also applicable to each class for which error detection codes are employed. Some at least of these classes may further form the subject of an error correcting coding within each transport frame.

The number of bits of said subsets can vary from one coded-signal frame to another. It is then advantageous to make provision for the number of bits of the error detection code calculated for a subset of bits to be an increasing function of the number of bits of said subset, to obtain uniform protection in the particular class considered.

In each transport frame, the total number of bits originating from said sets of bits to be protected is preferably constant, as is the total number of bits of said error detection codes. One and the same error correcting coding can then be applied to the blocks formed in the transport frames by the subsets of bits originating from said sets of bits to be protected and by their respective error detection codes.

Another aspect of the invention concerns a device for forming transport frames, to be transmitted on a communication channel, from coded-signal frames, wherein each coded-signal frame comprises at least one set of bits to be protected against transmission errors, including at least one subset of bits. The device comprises means for calculating a respective error detection code for each of said subsets of bits, and multiplexing means for placing each of said subsets of bits in a transport frame with its respective error detection code. The multiplexing means are arranged to place several subsets of bits, emanating from different coded-signal frames and accompanied by their respective error detection codes, in some at least of the transport frames.

A third aspect of the invention concerns a device for extracting coded-signal frames from transport frames received on a communication channel, wherein each coded-signal frame comprises at least one set of bits protected against transmission errors, including at least one subset of bits, the device comprising demultiplexing means for extracting from each transport frame at least one of said subsets of bits, accompanied by a respective error detection code, characterized in that the demultiplexing means are arranged to extract several subsets of bits from some at least of the transport frames, and to distribute these subsets of bits, associated with their respective error detection codes, in different coded-signal frames.

The invention is described below in its particular application to the transmission of voice signals on a radio channel.

Figure 1:
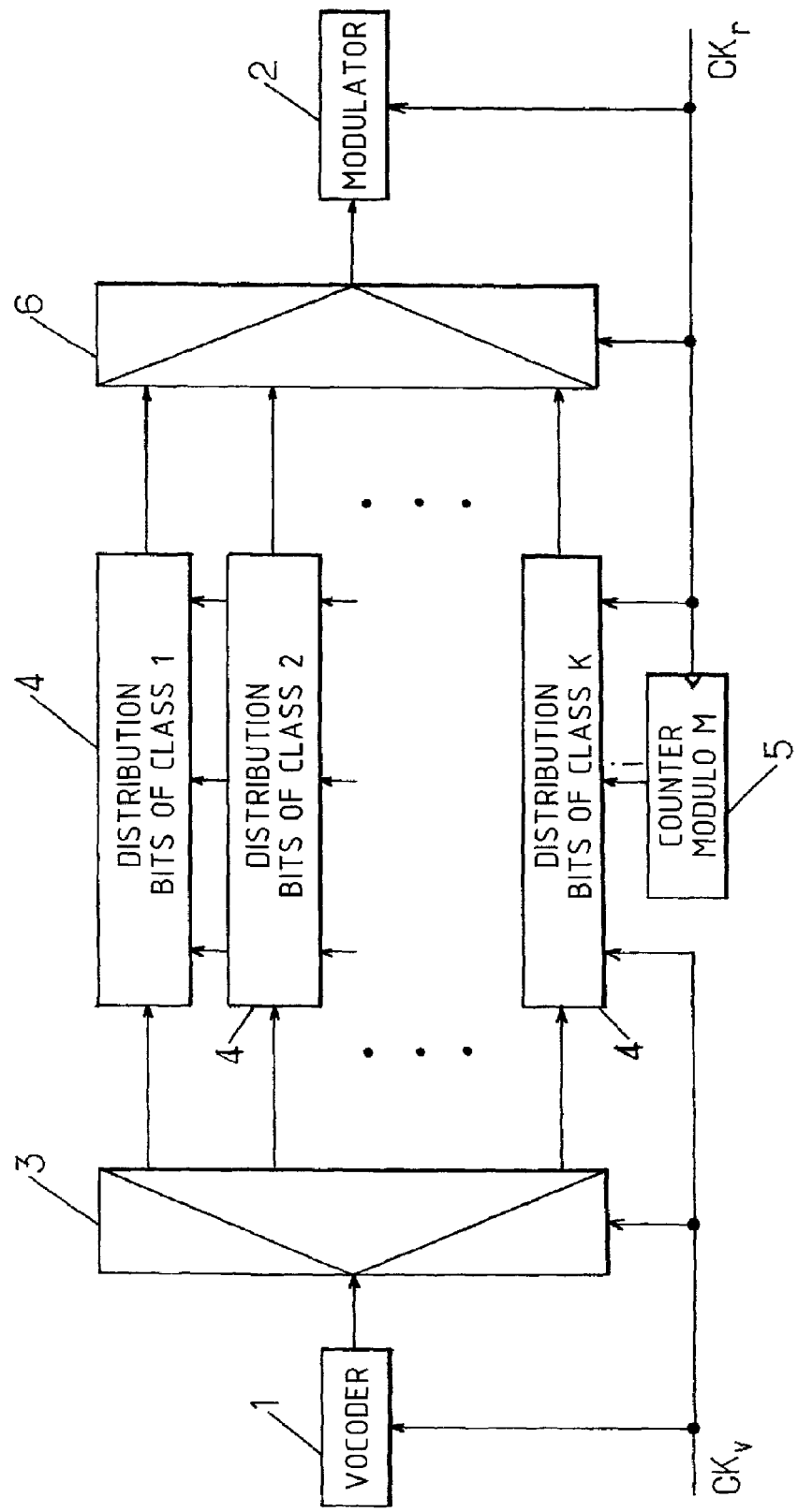
FIGS. 1 and 2 are respective schematic diagrams of a transmitter and a receiver implementing the present invention.
Figure 2:
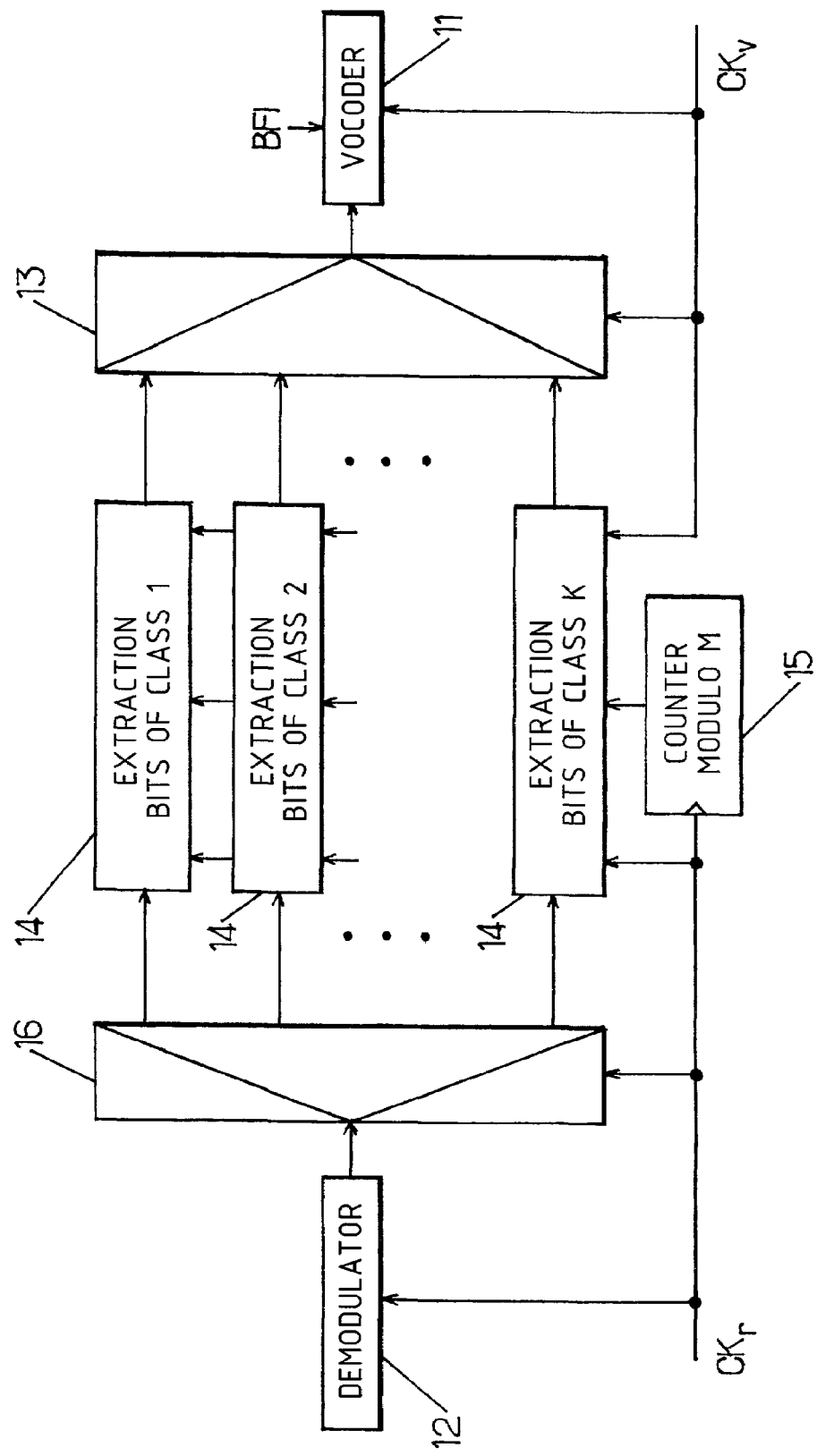

FIGS. 1 and 2 show the vocoders 1, 11 of the transmitter and of the receiver. The vocoder 1 of the transmitter delivers coded speech-signal frames each comprising $n_v$ bits, which will be processed by the vocoder 11 of the receiver to retrieve the speech signal. The clock of the speech frames is given by a periodic signal $CK_v$, the period d of the frames being for example 20 ms.

DETAILED DESCRIPTION

FIGS. 1 and 2 also show the modulator 2 and the demodulator 12 of the transmitter and of the receiver. The modulator 2 of the transmitter processes transport frames of $n_r$ bits, constructed from the frames produced by the vocoder 1. It forms the radio signal transmitted on an air interface. The radio signal received by the demodulator 12 is processed to retrieve corresponding transport frames, from which the receiver constructs the speech frames supplied to the vocoder 11.

The tempo of the transport frames is given by a clock signal $CK_r$. At the receiver level, this clock $CK_r$ is recovered, in a manner known per se, by a synchronization module (not represented). In the example considered here, the structure of the clock $CK_r$ is such that there are M transport frames over a duration T corresponding to N frame periods of the vocoder (T=N.d). The transport frames and the speech frames have for example the same duration d, in which case we have M<N. The radio channel used for the transmission of the transport frames is thus rendered available for a fraction (N−M)/N of the time. This fraction makes it possible to reserve time windows on the radio channel, to multiplex other logical channels or to accomplish other functions.

In the example illustrated by FIGS. 1 and 2, there are provided a number K of protection classes for the bits emanating from the vocoder 1 (K≧1). Class 1 corresponds for example to the bits which are perceptually most sensitive to transmission errors, and class K to the least sensitive bits.

A demultiplexer 3 receives the digital output stream from the vocoder 1, separates the bits of the various classes in each frame and supplies them to respective modules 4 whose role is to distribute these bits in the transport frames (it will be noted that the demultiplexer 3 can be implicitly integrated into the vocoder 1). Each distribution module 4 receives the clocks $CK_v$ and $CK_r$, as well as a frame index i ranging from 0 to M−1, delivered by a counter modulo M 5 regulated by the clock $CK_r$.

The distribution modules 4 deliver the bits to be inserted into each transport frame i over a span of duration T, which are assembled by a multiplexer 6 to form these transport frames supplied to the modulator 2 at the tempo $CK_r$.

Symmetrically, transport frames delivered by the demodulator 12 of the receiver are addressed to a demultiplexer 16 which separates the bits pertaining to the various protection classes, and supplies them to respective modules 14. These modules 14 perform the channel decoding operations and extract the bits of the various classes belonging to the successive speech frames. To do this, each module 14 receives the clocks $CK_r$ and $CK_v$, as well as the index i of the transport frames, which is supplied by a counter modulo M 15 regulated by the clock $CK_r$. For each speech frame, the extraction modules 14 supply the bits of the various classes, which are assembled by a multiplexer 13 (optional) to form the coded-speech frames addressed to the vocoder 11.

Figure 3:
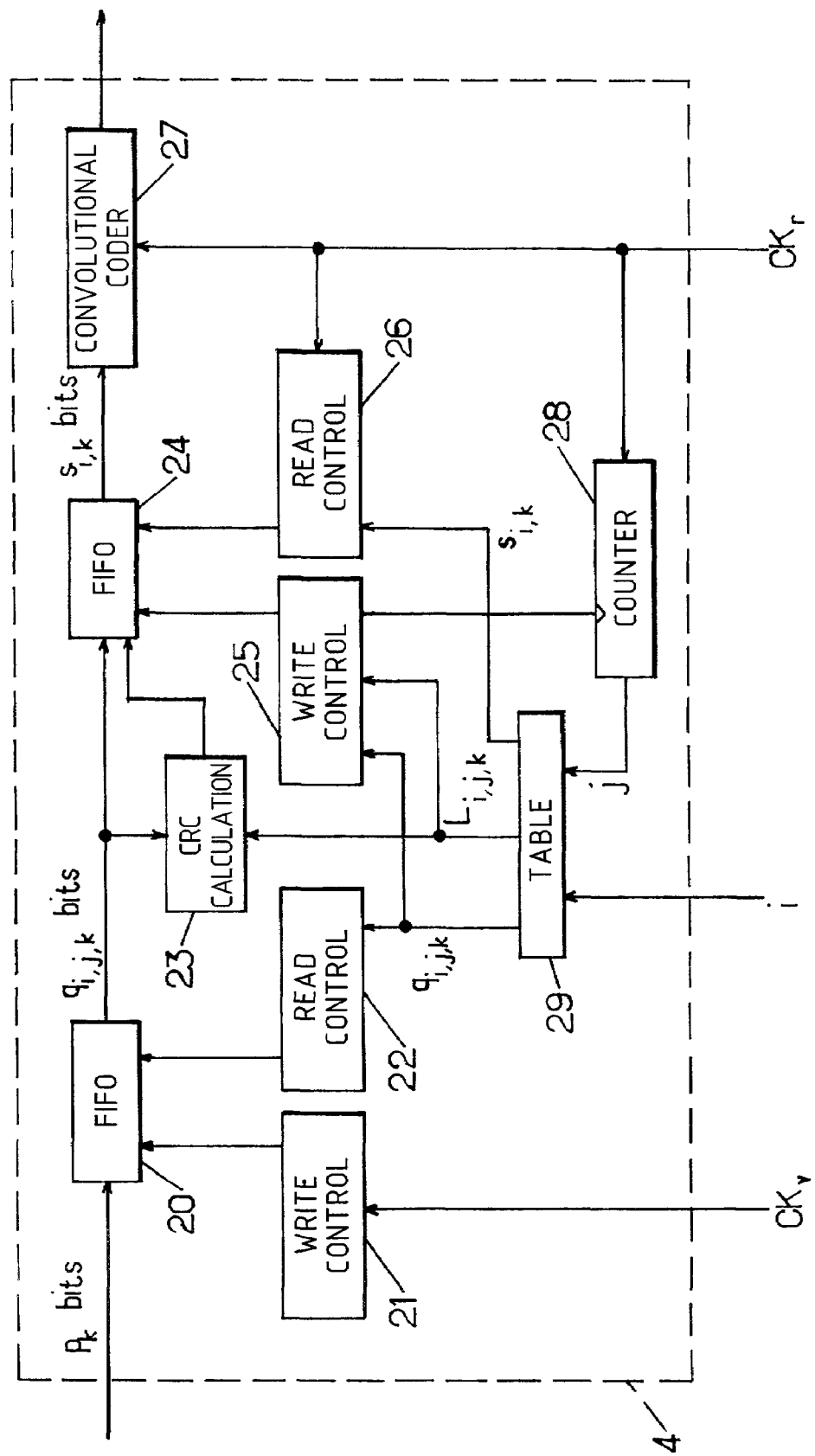
FIGS. 3 and 4 are schematic diagrams of modules for distributing and extracting bits respectively forming part of the transmitter and of the receiver according to FIGS. 1 and 2.

FIG. 3 illustrates a possible organization of the distribution module 4 for a protection class k (1≦k≦K), for which use is made on the one hand of an error detection code, or CRC ("Cyclic Redundancy Checksum"), and on the other hand of an error correcting coding, based on a convolutional code in the example represented.

Each coded-speech frame is regarded as comprising a set of $p_k$ bits for class k (with $$\sum_{k=1}^{K} p_k = n_v).$$

These $p_k$ bits are written to a memory 20 of first in-first out (FIFO) type receiving a corresponding write command from a unit 21 controlled by the clock $CK_v$.

Each set of $p_k$ bits is subdivided into one or more subsets of $q_{i,j,k}$ bits read successively from the FIFO memory 20 under the control of a unit 22. The index i is that delivered by the counter 5 and makes reference to the transport frames, while the index j makes reference to the successive coded-signal frames from which bits pertaining to class k and inserted into transport frame i emanate. If $r_{i,k}$ designates the number of bits of class k which are placed in transport frame i, without counting the redundancy bits (i.e. $r_{i,k}=p_k.N/M$ when $p_k$ is divisible by M), then the index j varies from 0 to $J_{i,k}$, the integer numbers $J_{i,k}$ being such that $$\sum_{i'=0}^{i} J_{i',k}$$

is the integer immediately less than $(i+1).r_{i,k}/p_k$, and $$\sum_{j=0}^{J_{i,k}} q_{i,j,k} = r_{i,k}.$$

Each subset of $q_{i,j,k}$ bits forms the subject of a CRC calculation by a unit 23 supplying an error detection code of $L_{i,j,k}$ bits. The unit 23 can conventionally consist of a shift register sequentially receiving the bits read from the memory 20, which register is associated with operators devised in accordance with the generating polynomial of the code employed to deliver the bits of the CRC sequentially after having received the subset of $q_{i,j,k}$ bits. When the number $L_{i,j,k}$ of bits of the CRC is variable (as a function of the indices i and j), the calculation unit 23 further comprises switches controlled by a signal indicating the number $L_{i,j,k}$ of bits of the code and making it possible to select the active operators.

The $q_{i,j,k}$ bits read from the FIFO memory 20, followed by the $L_{i,j,k}$ bits of the CRC which are calculated by the unit 23, are written to another memory 24 of FIFO type receiving a corresponding write command from a unit 25. The reading to the FIFO memory 24 is controlled by a unit 26 at the tempo of the clock $CK_r$. The block of $$s_{i,k} = r_{i,k} + \sum_{j=0}^{J_{i,k}} L_{i,j,k}$$

bits which is extracted from the FIFO memory 24 at each read corresponds to the $J_{i,k}$ subsets of bits and to the CRCs respectively associated with them. This block is addressed to the coding circuit 27 of the distribution module 4.

The circuit 27 has a conventional structure (shift register and associated operators). The rate $\rho$ of the convolutional coding is chosen as a function of the number $s_{i,k}$ of bits of the block and of the number of bits available for class k in the i-th radio frame of $n_r$ bits. To alter this rate, the circuit 27 can use a conventional procedure for puncturing convolutional codes, while possibly taking account of a known short sequence of bits which is appended to the block of $s_{i,k}$ bits to be coded and serves to initialize the trellis employed by the decoder. At each cycle of the clock $CK_r$, the bits of the transport frames pertaining to class k are addressed to the multiplexer 6 by the circuit 27.

In the embodiment represented in FIG. 3, the index j is supplied by a counter 28 reset to 0 at the start of each cycle of the clock $CK_r$ and incremented by a signal delivered by the unit 25 when the writing of a subset of $q_{i,j,k}$ bits and of the corresponding $L_{i,j,k}$ CRC bits has been performed in the FIFO memory 24. The indices i, j delivered by the counters 5, 28 serve for the addressing in a table 29 stored in the distribution module 4. This table 29 contains the predefined integer numbers $q_{i,j,k}$ and $L_{i,j,k}$, supplied to the units 22, 23, so as to adjust the transfers between the FIFO memories 20, 24 and the CRC calculations. It also contains the integer numbers $s_{i,k}$ supplied to the unit 26 so as to adjust transfers from the FIFO memory 24 to the coder 27.

Figure 4:
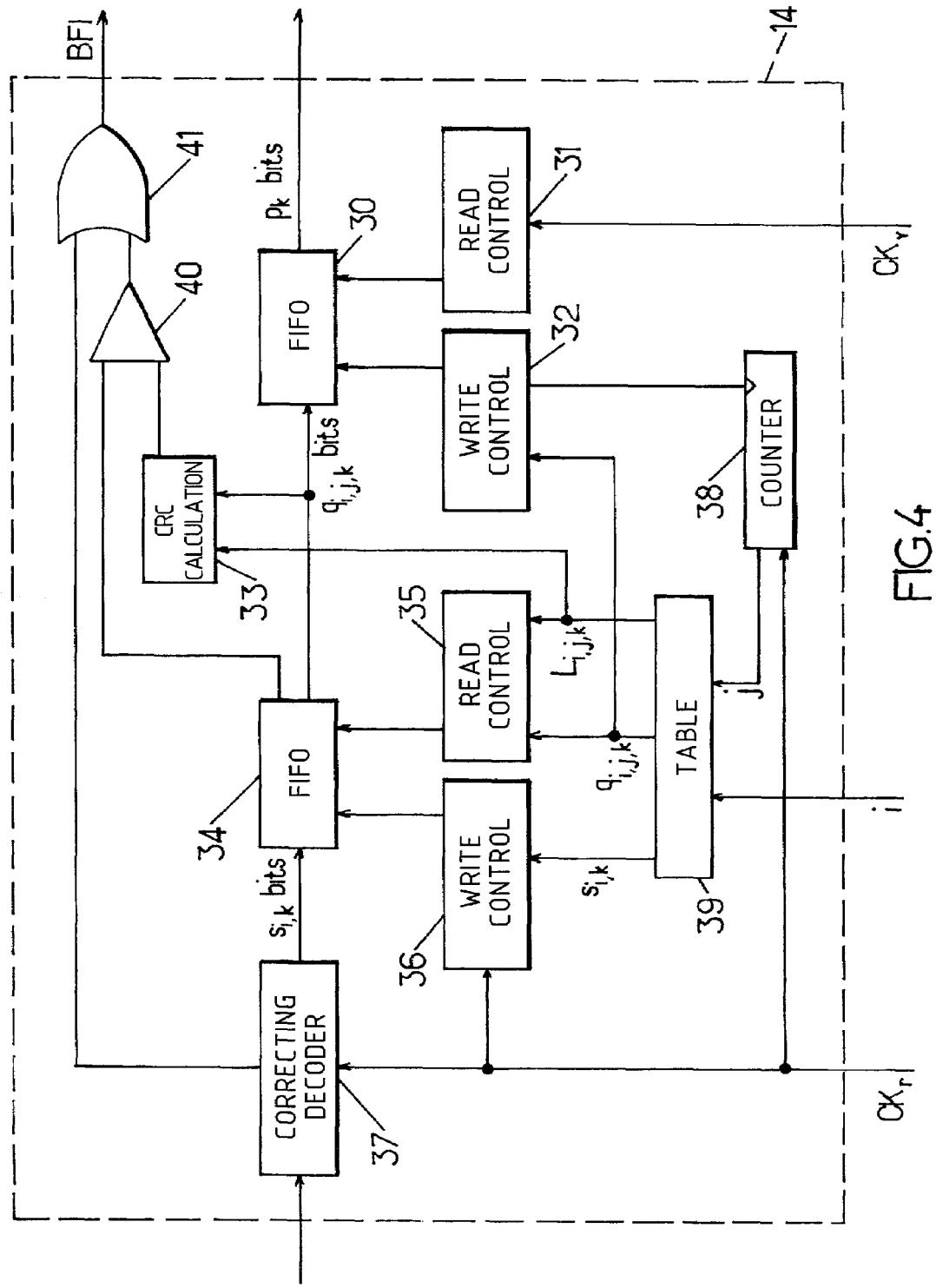

FIG. 4 illustrates a possible organization of an extraction module 14 corresponding to the distribution module 4 of FIG. 3.

The bits pertaining to class k are received from the demultiplexer 16 by the decoder 37, which utilizes the redundancy introduced into each transport frame by the coder 27 so as to correct any transmission errors. The decoder 37 has a conventional structure, and operates for example according to the Viterbi algorithm. For each transport frame, it delivers a block of $s_{i,k}$ decoded bits written to a memory 34 of FIFO type under the control of a unit 36 regulated by the clock $CK_r$. A unit 35 successively commands the readings of groups of $q_{i,j,k}+L_{i,j,k}$ bits in the FIFO memory 34. The $q_{i,j,k}$ bits of the "subset" are transferred to another FIFO memory 30, and moreover addressed to a CRC calculation unit 33 operating in the same way as the unit 23 of FIG. 3.

The unit 33 recalculates the CRC of $L_{i,j,k}$ bits which is associated with the $q_{i,j,k}$ bits of the subset. A comparator 40 receives this recalculated code as well as the $L_{i,j,k}$ CRC bits read from the FIFO memory 34 after the $q_{i,j,k}$ bits of the subset. The comparator 40 delivers a bit at 0 if the two CRCs coincide, and at 1 otherwise. This bit is addressed to an input of an OR gate 41 whose other input receives another error bit emanating from the correcting decoder 37. This error bit is placed at 1 in the course of the cycle of the clock $CK_r$ when the decoder 37 has estimated that the quality of the frame received was too poor for the decoding to be reliable. The OR gate 41 thus delivers a bit BFI indicating for each subset of $q_{i,j,k}$ bits whether a transmission error has or has not been detected. These bits BFI are supplied to the vocoder 11 of the receiver, which can then take appropriate measures to deal with the error detected, for example an interpolation of parameters.

It should be noted that the detection bits BFI are differentiated as a function of the coded speech-signal frames. Bits of another subset of $q_{i,j,k}$ bits which is placed in the same transport frame i but which belongs to another speech frame (j'≠j) are thus not regarded as erroneous on account of a pointwise error arising in a subset of $q_{i,j,k}$ bits and detected by virtue of the CRC.

The writes to the FIFO memory 30 of the extraction module 14 are controlled by a unit 32, by subsets of $q_{i,j,k}$ bits, and the reads are controlled by a unit 31 at the tempo of the clock $CK_v$, by sets of $p_k$ bits supplied successively to the multiplexer 13.

Like the distribution module 4 described previously, the extraction module 14 comprises a counter 38 reset to zero at the start of each cycle of the clock $CK_r$ and incremented by a signal emanating from the unit 32 when the writing of a subset $q_{i,j,k}$ bits has been performed in the FIFO memory 30. This counter 38 delivers the index j of the speech frames. The indices i, j produced by the counters 15, 38 serve for the addressing in a table 39 stored in the module 14. As previously, this table 39 contains the integer numbers $q_{i,j,k}$ and $L_{i,j,k}$ supplied to the modules 32, 33, 35 to adjust the transfers between the FIFO memories 34, 30 and the CRC calculations, as well as the integer numbers $s_{i,k}$ supplied to the unit 36 to adjust the transfers between the decoder 37 and the FIFO memory 34.

If a class k does not form the subject of any error correcting coding, the modules 4 and 14 may have the same structure as in FIGS. 3 and 4 without the circuits 27 and 37, the blocks of $s_{i,k}$ bits being addressed directly from the memory 24 to the multiplexer 6 and from the demultiplexer 16 to the memory 34.

If a class k does not form the subject of any CRC calculation, it is possible to dispense with the CRC calculation unit, with one of the two FIFO memories and with its units for controlling writing and reading in each of the modules 4, 14. The table 29, 39 can contain just the numbers $s_{i,k}$, the subdivision into subsets of $q_{i,j,k}$ bits being implicit owing to the successive writes and reads to and from the FIFO memory.

It will be noted that the structures represented in the figures are merely some examples from among others coming within the framework of the invention. Thus, each module 4, 14 could comprise just a single buffer memory. Moreover, in a given application, the numbers $q_{i,j,k}$, $L_{i,j,k}$ and $s_{i,k}$ are fixed, so that it is generally possible to dispense with the counters 28, 38 and with the tables 29, 39.

By way of example, the method according to the invention can be implemented with the following numerical values, corresponding to the application described in patent application FR-99 06345. The speech frames and transport frames have the same duration d of 20 ms. The speech coded on a span of duration T=180 ms (N=9) gives rise to the transmission of M=8 radio frames of $n_r$=140 bits. The coded speech-signal frame is composed of $n_v$=80 bits split into K=2 sensitivity classes. The sets of bits corresponding to each class have the same size, i.e. $p_1$=$p_2$=40, so that $r_{i,k}$=45 for all the frames and all the classes. No error detection or correction mechanism is applied to the less sensitive class 2 ($s_{i,2}$=$r_{i,2}$=45). For the other class, we have chosen $s_{i,1}$=51. The numbers of bits of the subsets and of the CRCs are indicated in Table I. The rate $\rho$ of the convolutional code, applied by the circuit 27 in the distribution module 4 relating to class 1, is such that $s_{i,1}/\rho+s_{i,2} \leq n_r$, i.e. $51/\rho+45 \leq 140$. In this application, the rate $\rho$ is therefore of the order of 0.54, this being achievable by puncturing a convolutional code of rate ½.

TABLE I

| i | $J_{i,1} = J_{i,2}$ | $q_{i,0,1} = q_{i,0,2}$ | $q_{i,1,1} = q_{i,1,2}$ | $L_{i,0,1}$ | $L_{i,1,1}$ | $L_{i,0,2} = L_{i,1,2}$ |
|---|---|---|---|---|---|---|
| 0 | 1 | 40 | 5 | 4 | 2 | 0 |
| 1 | 1 | 35 | 10 | 4 | 2 | 0 |
| 2 | 1 | 30 | 15 | 4 | 2 | 0 |
| 3 | 1 | 25 | 20 | 3 | 3 | 0 |
| 4 | 1 | 20 | 25 | 3 | 3 | 0 |
| 5 | 1 | 15 | 30 | 2 | 4 | 0 |
| 6 | 1 | 10 | 35 | 2 | 4 | 0 |
| 7 | 1 | 5 | 40 | 2 | 4 | 0 |

The invention claimed is:

1. Method for forming transport frames to be transmitted on a communication channel, from coded-signal frames, wherein each coded-signal frame comprises at least one set of bits to be protected against transmission errors, the method comprising the steps of:
    calculating a respective error detection code for at least one subset of bits included in said at least one set; and
    placing said at least one subset of bits in a respective transport frame with the error detection code calculated therefor,
wherein at least some of the transport frames contain a plurality of subsets of bits, emanating from different coded-signal frames and accompanied by the respective error detection codes calculated therefor and wherein the transport frames and the coded-signal frames comprise the same duration, and the content of N consecutive coded-signal frames is inserted into M consecutive transport frames, N and M being numbers such that N>M.

2. The method as claimed in claim 1, wherein the number of bits of said subsets varies from one coded-signal frame to another, and the number of bits of the error detection code calculated for a subset of bits is an increasing function of the number of bits of said subset.

3. The method as claimed in claim 1, wherein, in each transport frame, the total number of bits from said sets of bits to be protected is constant, as well as the total number of bits of said error detection codes.

4. Device for forming transport frames to be transmitted on a communication channel, from coded-signal frames, wherein each coded-signal frame comprises at least one set of bits to be protected against transmission errors, including at least one subset of bits, the device comprising:
    means for calculating a respective error detection code for said at least one subset of bits; and
    multiplexing means for placing said at least one subset of bits in a transport frame with the error detection code calculated therefor,
wherein the multiplexing means are arranged to place a plurality of subsets of bits, emanating from different coded-signal frames and accompanied by the respective error detection codes calculated therefor, in at least some of the transport frames, and wherein the transport frames and the coded-signal frames are of the same duration, and the content of N consecutive coded-signal frames is inserted into M consecutive transport frames, N and M being numbers such that N>M.

5. The device as claimed in claim 4, wherein the number of bits of said subsets varies from one coded-signal frame to another, and the number of bits of the error detection code calculated for a subset of bits is an increasing function of the number of bits of said subset.

6. The device as claimed in claim 4, wherein, in each transport frame, the total number of bits from said sets of bits to be protected is constant, as well as the total number of bits of said error detection codes.

7. The device as claimed in claim 6, further comprising coding means for applying, in each transport frame, an error correcting code to a block formed by the subsets of bits originating from said sets of bits to be protected and by the error detection codes respectively calculated therefor.

8. A device for extracting coded-signal frames from transport frames received on a communication channel, wherein each coded-signal frame comprises at least one set of bits protected against transmission errors, including at least one subset of bits, the device comprising demultiplexing means for extracting from each transport frame at least one of said subsets of bits, along with a respective error detection code, wherein the demultiplexing means are arranged to extract a plurality of subsets of bits from at least some of the transport frames, and to distribute the extracted subsets of bits, associated with their respective error detection codes, in different coded-signal frames, and wherein the transport frames and the coded-signal frames are of the same duration, and the content of N consecutive coded-signal frames is extracted from M consecutive transport frames, N and M being numbers such that N>M.

9. The device as claimed in claim 8, wherein the number of bits of said subsets varies from one coded-signal frame to another, and the number of bits of the error detection code for a subset of bits is an increasing function of the number of bits of said subset.

10. The device as claimed in claim 8, wherein, in each transport frame, the total number of bits from said sets of bits to be protected is constant, as well as the total number of bits of said error detection codes.

11. The device as claimed in claim 10, further comprising decoding means for correcting transmission errors in a block formed, in each transport frame, by the bits pertaining to said sets of protected bits and by said error detection codes.

* * * * *